United States Patent
Mukraj et al.

(10) Patent No.: US 10,678,569 B2
(45) Date of Patent: Jun. 9, 2020

(54) ENHANCED VIRTUAL DESKTOP INFRASTRUCTURES

(71) Applicant: Disney Enterprises, Inc., Burbank, CA (US)

(72) Inventors: Rabindra Mukraj, Scarsdale, NY (US); Ralph Maese, Nanuet, NY (US); Michael J. Strein, Bohemia, NY (US); Benjamin H. Kepler, Palisades, NY (US)

(73) Assignee: Disney Enterprises, Inc., Burbank, CA (US)

( * ) Notice: Subject to any disclaimer, the term of this patent is extended or adjusted under 35 U.S.C. 154(b) by 143 days.

(21) Appl. No.: 15/911,387

(22) Filed: Mar. 5, 2018

(65) Prior Publication Data
US 2019/0272185 A1    Sep. 5, 2019

(51) Int. Cl.
| G06F 15/16 | (2006.01) |
| G06F 9/451 | (2018.01) |
| H04L 12/18 | (2006.01) |
| H04L 12/24 | (2006.01) |
| G06F 13/10 | (2006.01) |
| H04L 29/06 | (2006.01) |

(52) U.S. Cl.
CPC ............ G06F 9/452 (2018.02); G06F 13/102 (2013.01); H04L 12/1845 (2013.01); H04L 41/22 (2013.01); H04L 63/0428 (2013.01); H04L 67/42 (2013.01); H04L 2212/00 (2013.01)

(58) Field of Classification Search
USPC .......................... 709/227, 201, 203, 217, 219
See application file for complete search history.

(56) References Cited

U.S. PATENT DOCUMENTS

| 9,043,391 | B2 | 5/2015 | Husain et al. |
| 9,201,755 | B2 | 12/2015 | Bidarkar et al. |
| 9,223,962 | B1 | 12/2015 | Kashyap et al. |
| 9,383,903 | B2 | 7/2016 | Sivakumar et al. |
| 9,516,053 | B1 | 12/2016 | Muddu et al. |
| 9,552,495 | B2 | 1/2017 | Yang et al. |
| 2009/0307189 | A1 | 12/2009 | Bobbitt et al. |
| 2013/0227352 | A1 | 8/2013 | Kumarasamy et al. |

OTHER PUBLICATIONS

S. Jaffer, et al., "Improving Remote Desktopping through Adaptive Record/Replay", VEE '15, Mar. 14-15, 2015, Istanbul, Turkey, 12 pages. <http://www.cse.iitd.emet.in/~sbansal/pubs/rdrr.pdf>.

(Continued)

*Primary Examiner* — Lan Dai T Truong
(74) *Attorney, Agent, or Firm* — Patterson + Sheridan, LLP (57) ABSTRACT

Performing an operation comprising providing, by a virtual desktop infrastructure (VDI) client, access to an application executing on a host system to a first client system via a network, receiving, from the first client system, at least one internet protocol (IP) packet specifying attributes of an input provided by an input/output (I/O) device of the client system, receiving a timestamp from a time source, and storing the attributes of the input and the timestamp as metadata of a first image corresponding to a first frame of a video output of the application.

20 Claims, 7 Drawing Sheets

(56) References Cited

OTHER PUBLICATIONS

G. Dunlap, et al., "ReVirt: Enabling Intrusion Analysis through Virtual-Machine Logging and Replay", Proceedings of the 2002 Symposium on Operating Systems Design and Implementation (OSDI), 14 pages. <http://web.eecs.umich.edu/virtual/papers/dunlap02.pdf>.
S. Huang, et al., "Proxy-based Security Audit System for Remote Desktop Access", IEEE, Sep. 11, 2009, 5 pages.
Spice, "Spice User Manual", Oct. 1, 2015, 13 pages.
C. Tsao, "Rapid Application Mobilization and Delivery for Smartphones" a Dissertation, Georgia Institute of Technology, Aug. 2012, 142 pages.
NetSupport Ltd., "NetSupport School Product Manual—Version 12.00", 2016, 383 pages.

ENHANCED VIRTUAL DESKTOP INFRASTRUCTURES

BACKGROUND

Field of the Invention

The present disclosure is related to virtual desktop infrastructures. More specifically, the disclosure is related to enhanced virtual desktop infrastructures.

Description of the Related Art

Virtual desktop infrastructures (or VDI) allow the viewable portion of an application to be presented via remote systems, while remote users can interface with the application via input/output (I/O) devices (e.g., keyboard, mouse, etc.). However, conventional solutions are proprietary and difficult to manage. Furthermore, because conventional solutions are constrained to a relatively small network or geographical area, dedicated conversion and transmission equipment is required to expand the coverage area to larger networks or geographical areas.

SUMMARY

In one embodiment, a method comprises providing, by a virtual desktop VDI client, access to an application executing on a host system to a first client system via a network, receiving, from the first client system, at least one IP packet specifying attributes of an input provided by an I/O device of the client system, receiving a timestamp from a time source, and storing the attributes of the input and the timestamp as metadata of a first image corresponding to a first frame of a video output of the application.

In another embodiment, a computer-readable storage medium stores instructions which when executed by a processor performs an operation comprising providing, by a virtual desktop VDI client, access to an application executing on a host system to a first client system via a network, receiving, from the first client system, at least one IP packet specifying attributes of an input provided by an I/O device of the client system, receiving a timestamp from a time source, and storing the attributes of the input and the timestamp as metadata of a first image corresponding to a first frame of a video output of the application.

In another embodiment, a system comprises a processor and a memory containing a program which when executed by the processor, performs an operation comprising providing, by a virtual desktop VDI client, access to an application executing on a host system to a first client system via a network, receiving, from the first client system, at least one IP packet specifying attributes of an input provided by an I/O device of the client system, receiving a timestamp from a time source, and storing the attributes of the input and the timestamp as metadata of a first image corresponding to a first frame of a video output of the application.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments disclosed herein provide enhanced virtual desktop infrastructures (VDI) for application sessions for one or more remote users. The enhanced VDI provides for distribution, recording, and archival of application sessions orchestrated by the VDI. Generally, embodiments disclosed herein leverage the Internet Protocol (IP) to capture the "desktop" of an application, which includes the visible video portion of the application outputted for display via a display device, as well as any input or output (I/O) generated by the application or one or more remote users. The enhanced VDI performs arbitration between different users for the control of I/O devices, and stores any user input or commands as metadata of the recorded video. By synchronizing I/O commands to a reference time source, embodiments disclosed herein facilitate enhanced forensic analysis of application sessions of the VDI.

Figure 1:
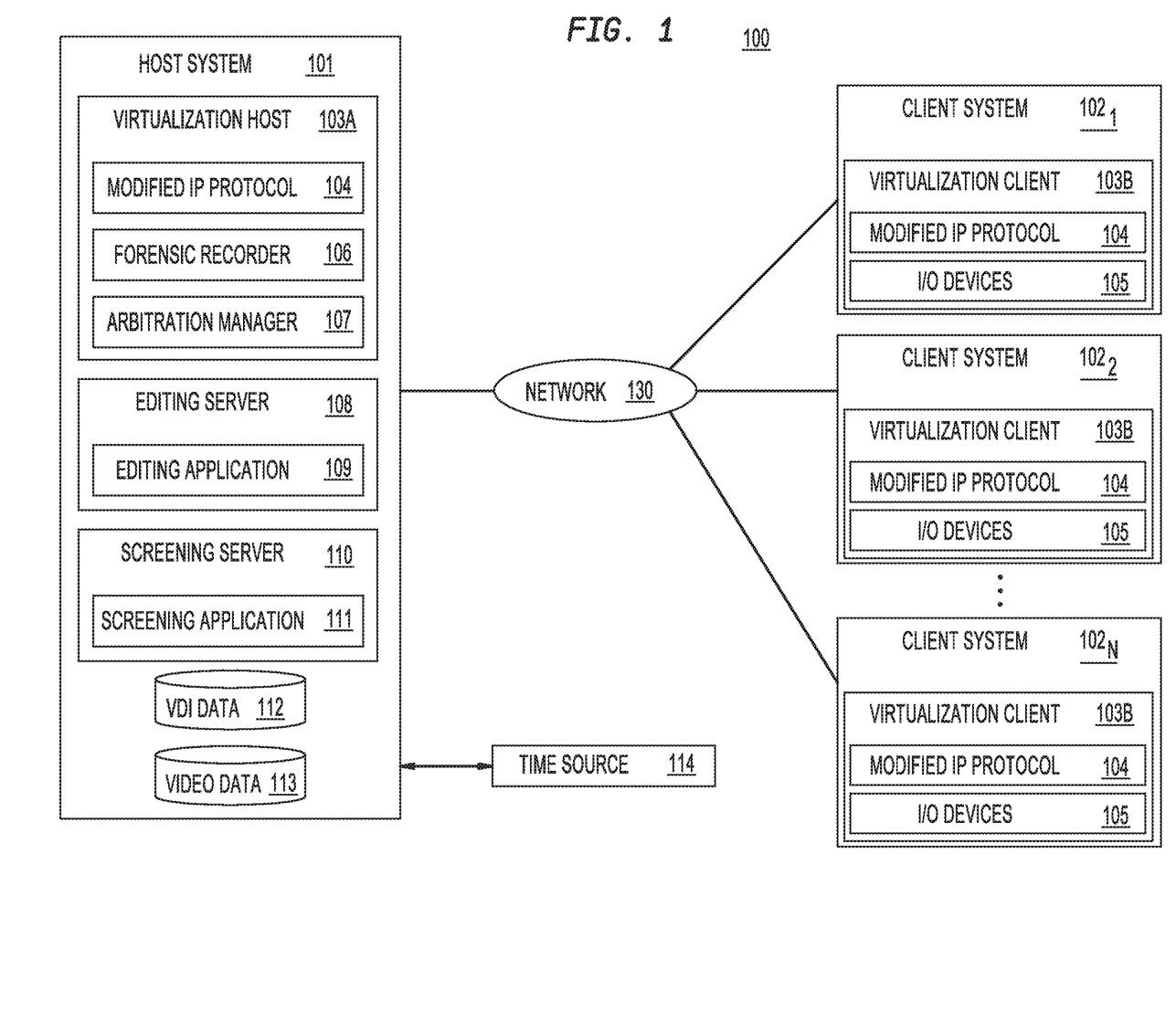
FIG. 1 illustrates a system which provides enhanced virtual desktop infrastructures, according to one embodiment.

FIG. 1 illustrates a system 100 which provides enhanced virtual desktop infrastructures, according to one embodiment. As shown, the system 100 includes at least one host system 101, one or more client systems $102_{1-N}$, and a time source 114. The host system 101 and the client systems $102_{1-N}$ are communicably coupled by a network 130 and are representative of physical and virtualized computing systems. The host system 101 is representative of a plurality of host systems 101, e.g., a data center, compute cluster, cloud computing environment, etc. The time source 114 is a reference time source (e.g., a clock), such as a network time protocol (NTP) time source, a precision time protocol (PTP) time source, and the like. As shown, the host system 101 includes an instance of a virtualization host 103A, an editing server 108 hosting an editing application 109, a screening server 110 hosting a screening application 111, and data stores of VDI data 112 and video data 113.

The virtualization host 103A is part of a virtual desktop infrastructure (VDI) which allows remote presentation of an operating system (OS) and applications to the virtualization client 103B of one or more client systems $102_{1-N}$. Generally, the virtualization host 103A captures the I/O portions of applications and the OS, where the I/O portions include the viewable video portion (e.g., the application desktop), inputs (e.g., keystrokes, mouse clicks, etc.), other outputs (e.g. audio, tactile feedback, etc.), and any other file, object, application, OS, or user I/O operation. The virtualization host 103A encapsulates the captured I/O portions in one or more IP packets, where the IP packets are generated according to a modified IP protocol 104. The modified IP protocol 104 is representative of a protocol used to present VDI sessions to one or more client systems $102_{1-N}$, where the VDI sessions can be recorded and archived. One example of a modified IP protocol 104 is based on the PCoIP® protocol that is modified to facilitate recording of VDI application sessions hosted by the virtualization host 103A.

More generally, the virtualization host 103A uses the modified IP protocol 104 to generate images that correspond to frames of viewable video data of an application, OS, or both. In at least one embodiment, the virtualization host 103A or modified IP protocol 104 may optionally generate the images according to a configurable resolution or framerate. The virtualization host 103A or modified IP protocol 104 may optionally compress the generated image for a given application or OS frame. Furthermore, the virtualization host 103A or modified IP protocol 104 may also generate data representing a current I/O state, which reflects any application or user input or output, such as keystrokes, mouse location and inputs, audio feedback, and the like. The virtualization host 103A or modified IP protocol 104 may then encrypt the generated video and I/O state data, encapsulate the encrypted data into one or more IP packets based on the modified IP protocol 104, and transmit the IP packets via the network 130 to one or more authenticated virtualization clients 103B on the client devices $102_{1-N}$.

The virtualization host 103A may transmit the IP packets via user datagram protocol (UDP) unicast transmission streams and a multicast transmission stream. For example, if the client systems $102_{1-N}$ are on the same local area network (LAN) (or connected to the LAN via a virtual private network (VPN)), the virtualization host 103A may transmit packets of a remote application session via a multicast stream which is replicated to all client systems $102_{1-N}$. In multicast embodiments, the virtualization client 103B of the client systems $102_{1-N}$ would return separate, synchronized unicast sessions carrying data specific to each client system $102_{1-N}$ (e.g. I/O inputs from the respective I/O devices 105, if any). However, if one or more client systems $102_{1-N}$ are not on the same LAN (e.g., are connected via the Internet without a VPN), the virtualization host 103A transmits the IP packets via a plurality of synchronized UDP unicast streams, where each UDP unicast stream targets a respective client system $102_{1-N}$. Each UDP unicast stream carries the application or OS information as well as any data specific to the corresponding client system $102_{1-N}$.

As shown, the virtualization host 103A further includes a forensic recorder 106 and an arbitration manager 107. The forensic recorder 106 is configured to record VDI application sessions and any user I/O operations received from the client systems $102_{1-N}$ in the VDI data 112 (or another storage location). Generally, as the virtualization host 103A captures the I/O portions of the application or OS, the forensic recorder stores the image of each frame or the generated IP packet in the VDI data 112. Each image or IP packet may also be associated with a timestamp received from the time source 114. As users provide input via the I/O devices 105 (e.g., keystrokes, mouse clicks, speech commands, biometric information, etc.), the forensic recorder 106 includes the user input as metadata of each image in the VDI data 112. In at least one embodiment, the forensic recorder 106 stores attributes of the received user input and a timestamp received from the time source 114 as metadata of the corresponding image in the VDI data 112. The forensic recorder 106 may record encrypted or unencrypted data in the VDI data 112. Furthermore, in embodiments where multiple UDP unicast streams are transmitted to the client systems $102_{1-N}$, the forensic recorder 106 may record each stream to the VDI data 112. In multicast embodiments, the forensic recorder 106 records the multicast stream data as well as the unicast streams returned by the virtualization clients 103B. In at least one embodiment, the forensic recorder 106 parses input from I/O devices 105 in the return unicast streams based on which user is in control of the session as determined by the arbitration manager 107.

The arbitration manager 107 performs arbitration between the client systems $102_{1-N}$ to determine which of the I/O devices 105 are in control of an application session, e.g., can provide input to an application or OS via the virtualization client 103B. For example, users of the virtualization client 103B on client systems $102_{1,2}$ may remotely interact with the screening application 111 of the screening server 110 via the virtualization host 103A to screen a video from the video data 113. During the remote session of the screening application 111, the arbitration manager 107 performs arbitration between the users of systems $102_{1,2}$ such that only one user is providing input (e.g., keystrokes, mouse clicks, mouse position) via the I/O devices 105 to the screening application 111 at a given time. In some embodiments, the arbitration manager 107 also controls which of the client systems $102_{1-N}$ becomes the "focal point" of a VDI session. For example, the virtualization client 103B of client system $102_1$ may become the focal point of a VDI session of the screening application 111, such that the virtualization host 103A transmits the application state of the screening application 111 of the virtualization client 103B of the client system $102_1$ to the client system $102_2$. Similarly, to protect sensitive information on client system $102_N$, the arbitration manager 107 may restrict client system $102_N$ from becoming the focal point during a VDI session of an application.

As users provide input via the I/O devices 105, the virtualization client 103B of the associated client system $102_{1-N}$ generates and transmits one or more IP packets to the virtualization host 103A reflecting the input. The virtualization client 103B may generate the packets according to the modified IP protocol 104, which may be encrypted, compressed, or encrypted and compressed, and transmit the packets as a unicast stream to the virtualization host 103A via the network 130. When the IP packets are received, the forensic recorder 106 or the virtualization host 103A receives a timestamp from the time source 114 for each associated packet. For example, if a user clicks the left mouse button via the virtualization client 103B, the left mouse click may be associated with a timestamp received from the time source 114. The forensic recorder 106 may then record the timestamp and an indication of the left mouse click as metadata of the corresponding application video frame in the VDI data 112. The virtualization host 103A may also provide the received input to the associated application, which processes the input accordingly. For example, if the left mouse click specifies to open a file from the video data 113, the associated application may open the file, and the virtualization host 103A may transmit video frames depicting the opening of the file to the virtualization clients 1036.

More generally, as an example, one or more users of the client systems $102_{1,2,N}$ may wish to edit a video stored in the video data 113 using the editing application 109 of the editing server 108. In at least one embodiment, each user authenticates with the virtualization host 103A (and optionally the editing application 109) by providing login credentials (e.g., a username and password) via the virtualization client 103B. The virtualization host 103A of the host system 101 may execute an instance of the editing server 108 or editing application 109 (if not already executing). As the editing application 109 executes, the virtualization host 103A generates one or more IP packets according to the modified IP protocol 104, where the IP packets include the visible display portion of the video of the editing application 109 and the I/O state data (e.g., keystrokes, mouse coordinates, mouse input, audio output, etc.) of the editing application 109. The IP packets may include compressed data, encrypted data, or encrypted and compressed data, which may then be transmitted to the client systems $102_{1,2,N}$ via the network 130. If the client systems $102_{1,2,N}$ are on the same network, the IP packets are transmitted as a multicast stream. Otherwise, the virtualization host 103A transmits a unicast stream of IP packets to each client system $102_{1,2,N}$. Once received, the virtualization clients 103B may extract the payload data from each IP packet, decrypt the payload data, decompress the payload data, and output the visible portion of the editing application 109 via an I/O device 105 (e.g., a monitor, smartphone display, or any other display device) of the corresponding client system $102_{1,2,N}$. Similarly, the virtualization client 103B may transmit IP packets reflecting user input provided by the I/O devices 105, such as by moving a mouse cursor, outputting audio via an I/O device (e.g., a speaker), and the like. Because of the high data rate and low latency supported by the IP protocol 104, the remote presentation of the editing application 109 appears seamless to all users. Similarly, the virtualization clients 103B may transmit unicast packet streams to the virtualization host 103A reflecting user input provided by the I/O devices 105, such as by moving a mouse cursor, providing keystrokes, touching a touchscreen display, etc. Once received, the virtualization host 103A associates each element of user input with a timestamp from the time source 114, and stores an indication of the user input in the VDI data 112.

The virtualization host 103A may also apply parameters specific to each authenticated user of an application (e.g., the editing application 109, screening application 111, or any other application). For example, the user of client system $102_2$ may have a user profile in the virtualization host 103A which specifies to provide enhanced quality of service (QoS), which is applied IP packets delivered to the client system $102_2$ (or any other system used by the associated user). Furthermore, the arbitration manager 107 may limit capabilities by authorization. For example, the arbitration manager 107 may allow an example user A to have access to the keyboard and mouse during a VDI session, while user B has access only to the mouse, and user C has no access to the keyboard or mouse.

Figure 2A:
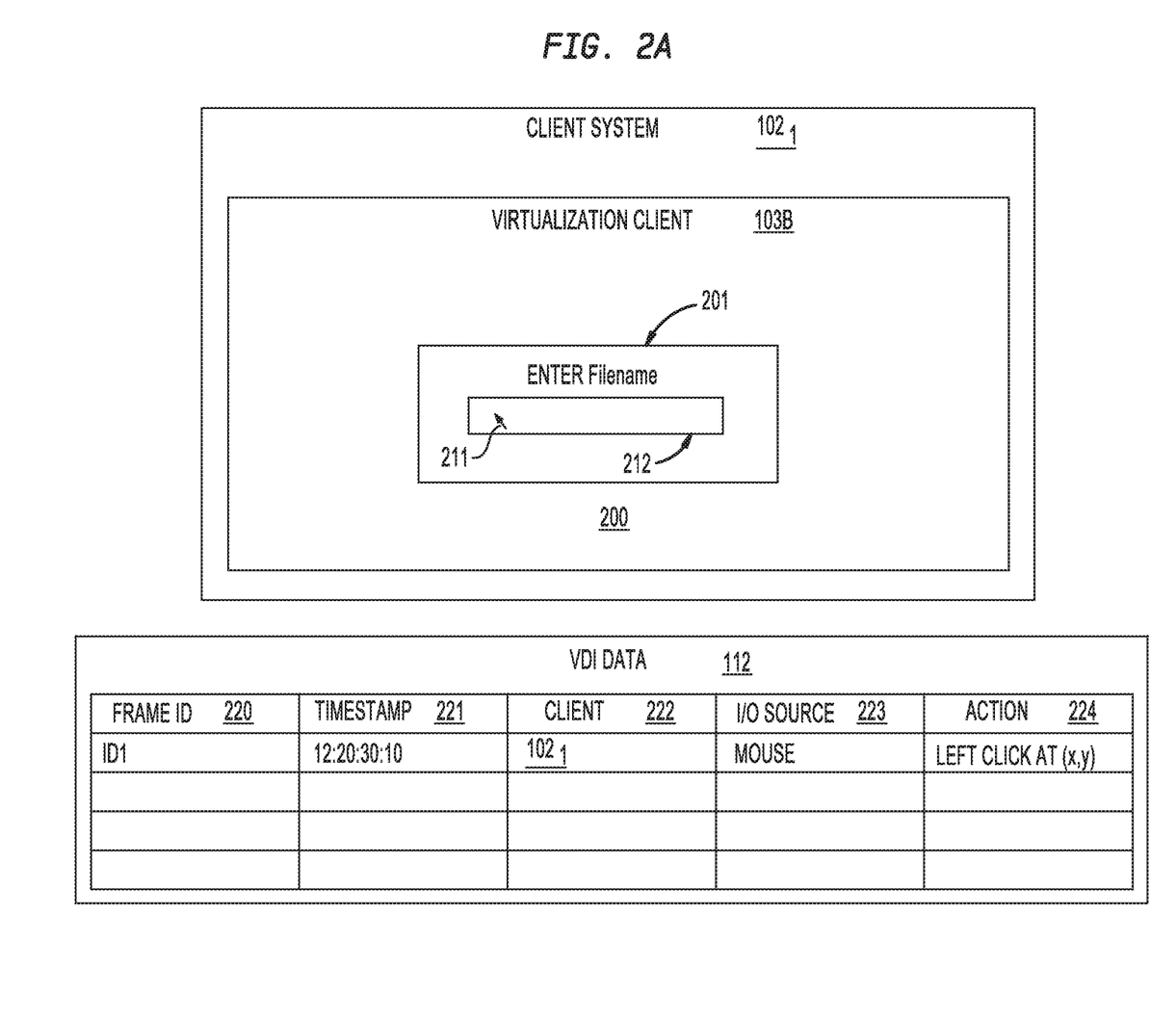
FIGS. 2A-2B illustrate techniques for enhanced virtual desktop infrastructures, according to various embodiments.

FIG. 2A illustrates techniques for enhanced virtual desktop infrastructures, according to one embodiment. As shown, FIG. 2A depicts the client system $102_1$ outputting a graphical user interface (GUI) 200 for display within the virtualization client 103B. The GUI 200 may be the GUI of any application executing on the host system 101, e.g., the editing application 109 or the screening application 111. As such, the GUI 200 mirrors the GUI that is captured by the virtualization host 103A and transmitted to the client system $102_1$ via the modified IP protocol 104.

As shown, the GUI 200 includes an example popup box 201 where a user can enter the filename of a file in an input field 212. The GUI 200 further depicts a mouse cursor 211 controlled by the user of the client system $102_1$. As the user controls the mouse cursor 211, the virtualization client 103B transmits a unicast stream including data describing the control of the mouse cursor 211. Once received by the virtualization host 103A, the data is extracted from the unicast stream and an entry describing the control of the mouse cursor 211 is stored in the VDI data 112. As shown, the VDI data 112 includes example columns 220-224, which depicts an embodiment I/O data is stored as metadata associated with an image corresponding to a frame of the display portion of the application presented via the virtualization host 103A. However, as previously stated, the data may be stored in the data space of a video, e.g., the horizontal ancillary data space (HANC) or vertical ancillary data space (VANC) of a video.

As shown, the column 220 corresponds to a frame identifier, which identifies an image frame generated by the virtualization host 103A for the application being presented remotely to the client system $102_1$. Generally, any technique may be used to identify the image frames generated by the virtualization host 103A for the application, such as sequential identifiers, hash values, IP header values, and the like. The column 221 corresponds to a timestamp received from the time source 114 for the user input. The column 222 corresponds to the client system $102_{1-N}$ that is in control of the I/O devices and providing the input (although a user ID may be included in some embodiments). The I/O source 223 identifies an I/O device 105 that is providing the input, while the action 224 describes the type of input received. The columns 220-224 are for illustrative purposes only and should not be considered limiting of the disclosure, as any number and type of attributes of I/O operations may be stored in the VDI data 112.

In the example depicted in FIG. 2A, the VDI data 112 reflects the user of client system $102_1$ clicking on the input field 212 of the GUI 200 with the mouse cursor 211 to enter a filename. As such, the VDI data 112 reflects input received from the virtualization client 103B describing the mouse click. As shown, the frame ID 220 corresponds to an example frame identifier, the timestamp 221 reflects an example timestamp, the client 222 reflects that the client system $102_1$ provided the input, the I/O source 223 is a mouse, and the action 224 specifies that the user clicked the left mouse button at example (x,y) coordinates of the GUI 200.

Figure 2B:
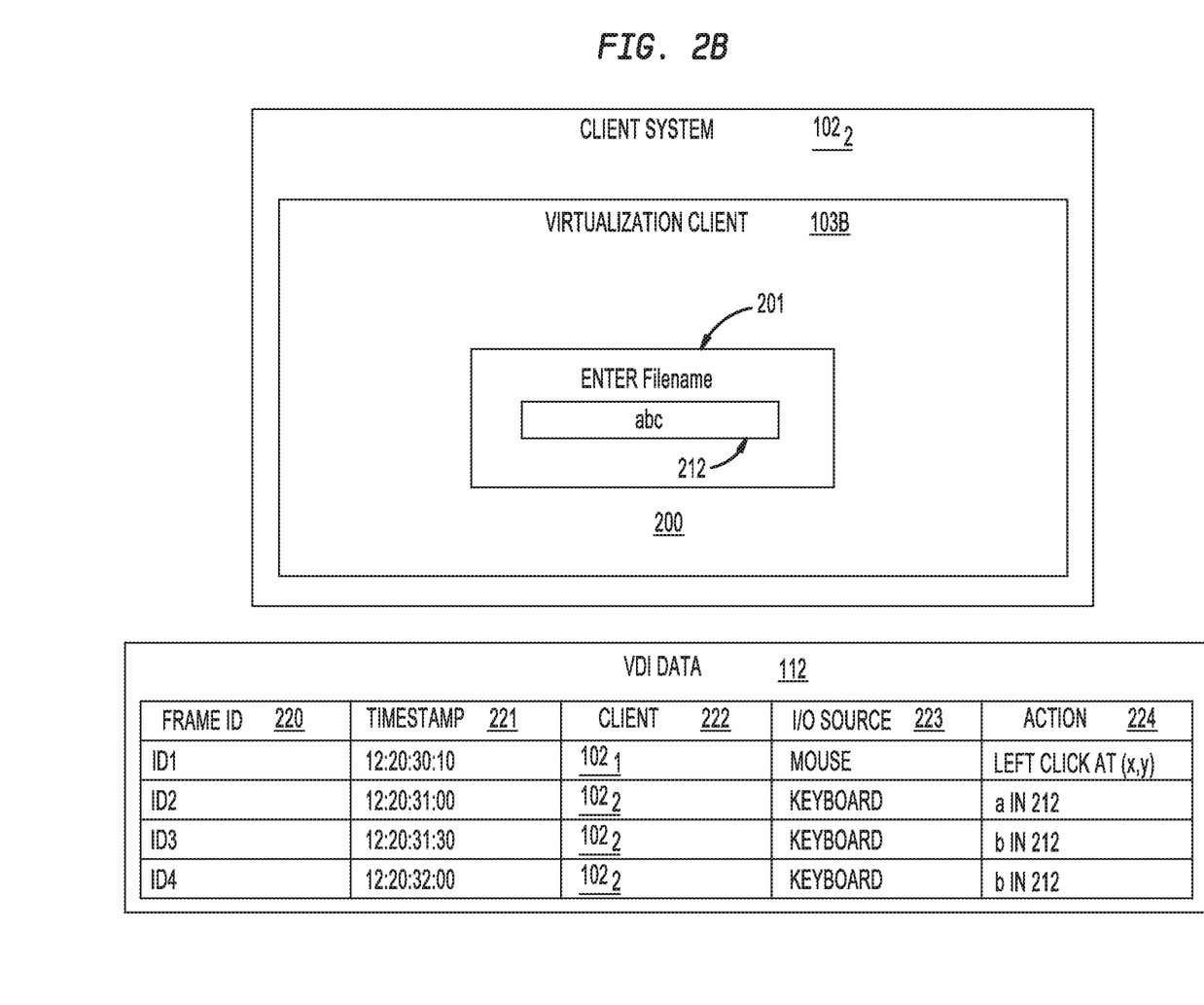

FIG. 2B depicts the GUI 200 of FIG. 2A outputted for display via the virtualization client 103B of the client system $102_2$. FIG. 2B depicts the GUI 200 after a user of client system $102_2$ has been granted control of the I/O devices by the arbitration manager 107 and entered the characters "abc" (e.g., via a physical or virtual keyboard) to define a portion of the filename in input field 212. As the user of client system $102_2$ enters each keystroke, the virtualization client 103B transmits an indication of the keystroke to the virtualization host 103A of the host system 101 via one or more IP packets in a unicast stream. The virtualization host 103A extracts the data from the unicast stream of the client system $102_2$, and updates the VDI data 112 accordingly. As shown, the VDI data 112 now includes entries corresponding to each character provided as input via the GUI 200.

Furthermore, as the virtualization host 103A receives the indications of keystrokes from the virtualization client 103B of client system $102_2$, the virtualization host 103A provides the input to the corresponding application. As the application is modified based on the input, the virtualization host 103A captures one or more images reflecting the input, and transmits the images to other remote systems participating in the remote session (e.g., the client system $102_1$) based on the modified IP protocol 104 as described above. Therefore, as the user of client system $102_2$ enters the characters in the input field 212, the GUI 200 outputted by the virtualization client 103B of client system $102_1$ is updated to reflect that the characters have been entered.

Figure 3:
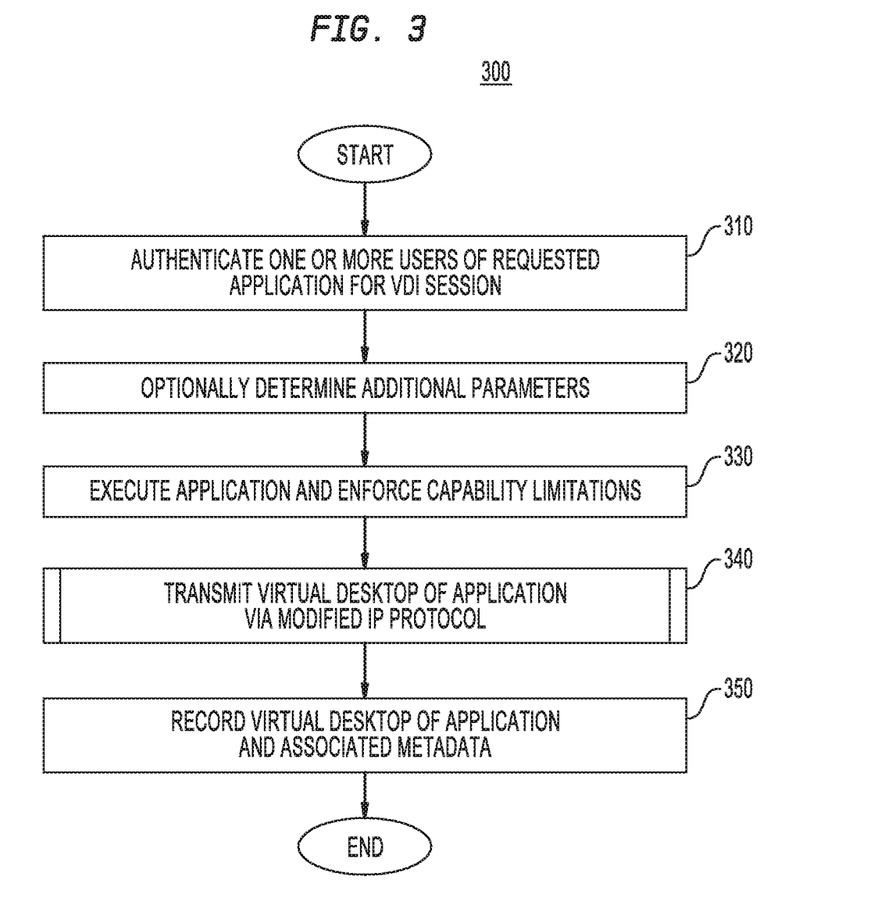
FIG. 3 is a flow chart illustrating a method for enhanced virtual desktop infrastructures, according to one embodiment.

FIG. 3 is a flow chart illustrating a method 300 for enhanced virtual desktop infrastructures, according to one embodiment. As shown, the method 300 begins at block 310, where one or more users are authenticated by the virtualization host 103A or a requested application (e.g., the editing application 109, the screening application 111, etc.) for a VDI session. Generally, users of the virtualization client 103B on one or more client systems $102_{1-N}$ may specify to connect to the virtualization host 103A on the host system 101, select an application for execution, and provide any login credentials. At block 320, the users may optionally specify additional parameters, such as a desired framerate or resolution for images generated by the virtualization host 103A that reflect the visual desktop of the selected application. For example, the users may specify a relatively high frame rate and resolution for editing high-quality videos stored in the video data 113 via the editing application 109. As another example, the users may specify a lower resolution and lower framerate for a troubleshooting session when having technical issues with the screening application 111. At block 330, the virtualization host 103A executes the requested application and enforces any capability limitations associated with a user profile of the authenticated users (e.g., whether the users can control the I/O devices, access files, etc.). The virtualization host 103A may also apply QoS and implement other functionality based on the user profiles.

At block 340, described in greater detail with reference to FIG. 4, the virtualization host 103A transmits the virtual desktop (e.g., the viewable video portion of the selected application) and any I/O state data to the authenticated remote users via the modified IP protocol 104. Generally, for a given frame of video output of the selected application, the virtualization host 103A generates an image at the desired resolution, optionally compresses the image, optionally adds any additional I/O state data, encrypts the data (e.g., using public/private key encryption), encapsulates the encrypted data in one or more IP packets, and transmits the packets to the authenticated clients. If the clients are on the same LAN, the virtualization host 103A transmits a multicast stream. Otherwise, the virtualization host 103A transmits synchronized unicast streams to the authenticated clients. Once received, the virtualization clients 103B extract the payload data from the multicast or unicast streams, unencrypt the encrypted data, output the image data for display on a display device, and output any additional I/O state data (e.g., audio). The users may then interact with the application remotely via the virtualization client 103B. At block 350, the forensic recorder 106 of the virtualization host 103A records the virtual desktop of the selected application and any associated metadata in the VDI data 112.

Figure 4:
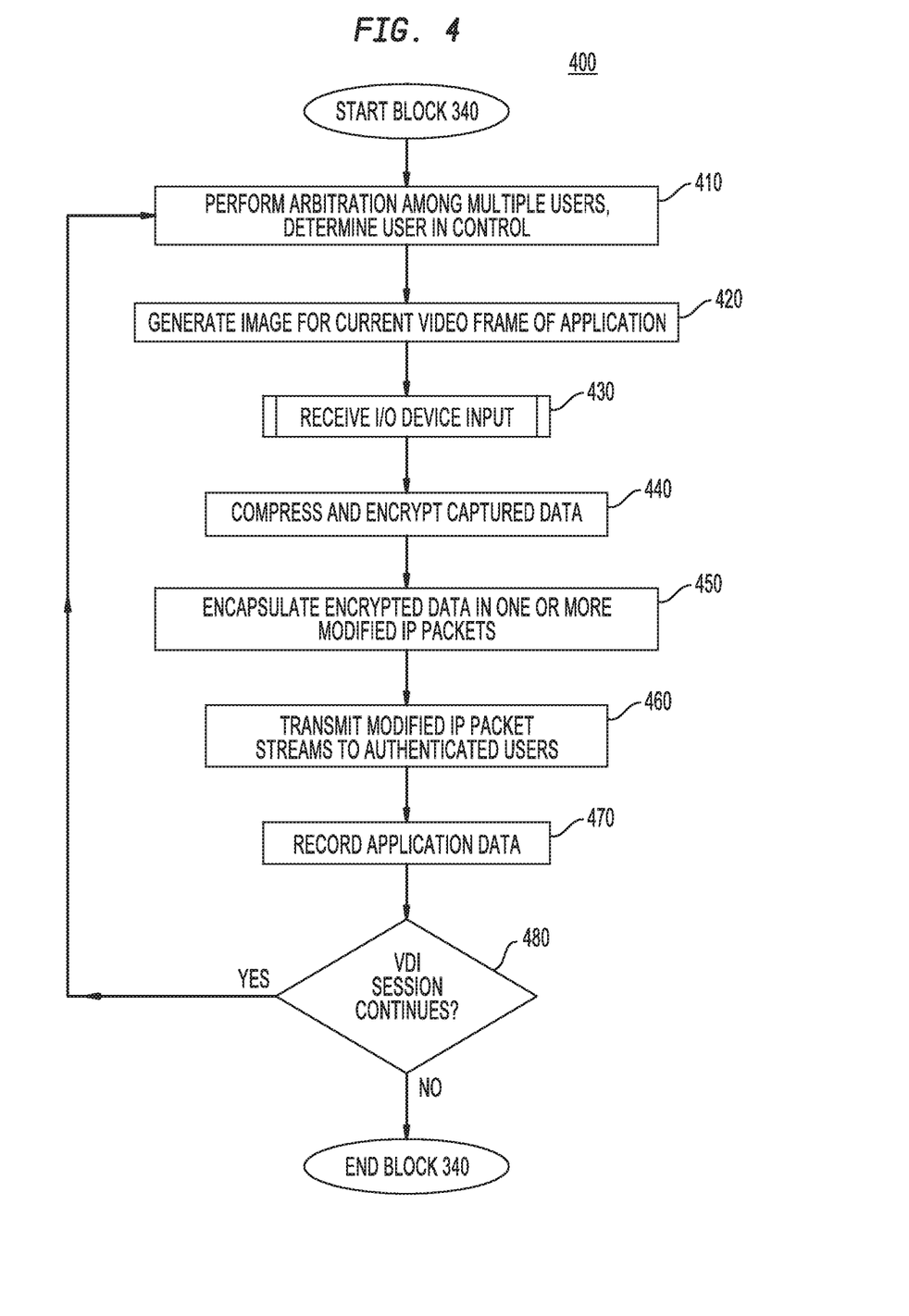
FIG. 4 is a flow chart illustrating a method to transmit a virtual desktop via a modified IP protocol, according to one embodiment.

FIG. 4 is a flow chart illustrating a method 400 corresponding to block 340 to transmit a virtual desktop via a modified IP protocol, according to one embodiment. Generally, the method 400 is performed for each frame of the viewable display of the executing application or OS during the VDI session. At block 410, the arbitration manager 107 performs arbitration among the authenticated users to determine a user currently in control of the I/O to the executing application. The arbitration manager 107 may use any type of arbitration scheme. Example arbitration schemes include first come first serve, round robin, and priority-based arbitration. In at least one embodiment, a user must request control from the arbitration manager 107, which determines whether to grant the request for control of the I/O devices. At block 420, the virtualization host 103A generates an image for the current video frame of the application based on the pixels generated by the application. At block 430, described in greater detail with reference to FIG. 5, the virtualization host 103A optionally receives I/O device input from the user of client system $102_{1-N}$ that is determined to be in control of the I/O devices at block 410.

At block 440, the virtualization host 103A compresses and encrypts the image data and any I/O device input. At block 450, the virtualization host 103A encapsulates the encrypted data in one or more IP packets formatted according to the modified IP protocol 104. At block 460, the virtualization host 103A transmits streams of modified IP packets to the authenticated users of the client systems $102_{1-N}$. At block 470, the virtualization host 103A records the current frame of application data, including the image generated at block 430, and any received I/O device input received at block 430. The virtualization host 103A generally stores the image, a timestamp received from the time source 114, and any metadata in the VDI data 112. At block 480, the virtualization host 103A determines whether the VDI session continues. If more the VDI session continues, the method 400 returns to block 410, otherwise the method 400 ends.

Figure 5:
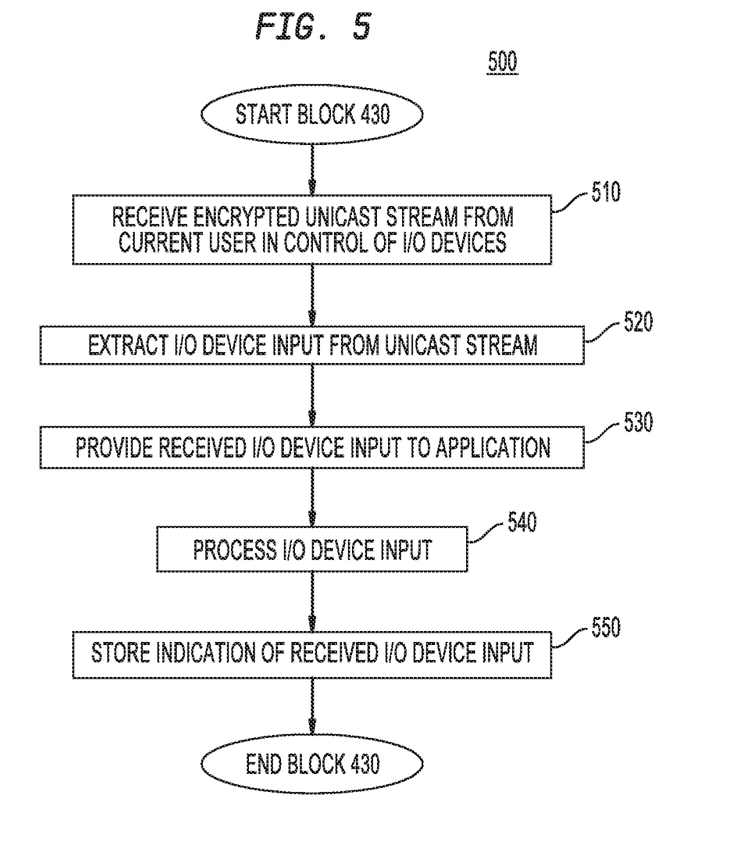
FIG. 5 is a flow chart illustrating a method to capture input, according to one embodiment.

FIG. 5 is a flow chart illustrating a method 500 corresponding to block 430 to capture input, according to one embodiment. As shown, the method 500 begins at block 510, where the virtualization host 103A receives a unicast stream of encrypted data from the user in control of the I/O devices 105. At block 520, the virtualization host 103A decrypts the received data and extracts (e.g., parses) any I/O device input specified in the payload. For example, the virtualization host 103A may extract keystroke information, mouse information, mouse clicks, and the like. At block 530, the virtualization host 103A provides the received input to the executing application. At block 540, the application processes the I/O input and performs one or more corresponding operations (e.g., saving a file, opening a file, modifying parameters, etc.). At block 550, the forensic recorder 106 stores an indication of the received I/O input in the VDI data 112. The indication may include a timestamp received from the time source 114, a description of the type of I/O input, the I/O input, the target of the input, and the like. The indication may be stored in the data space of an image generated by the virtualization host 103A for the current frame of the application, or as metadata of the generated image.

Figure 6:
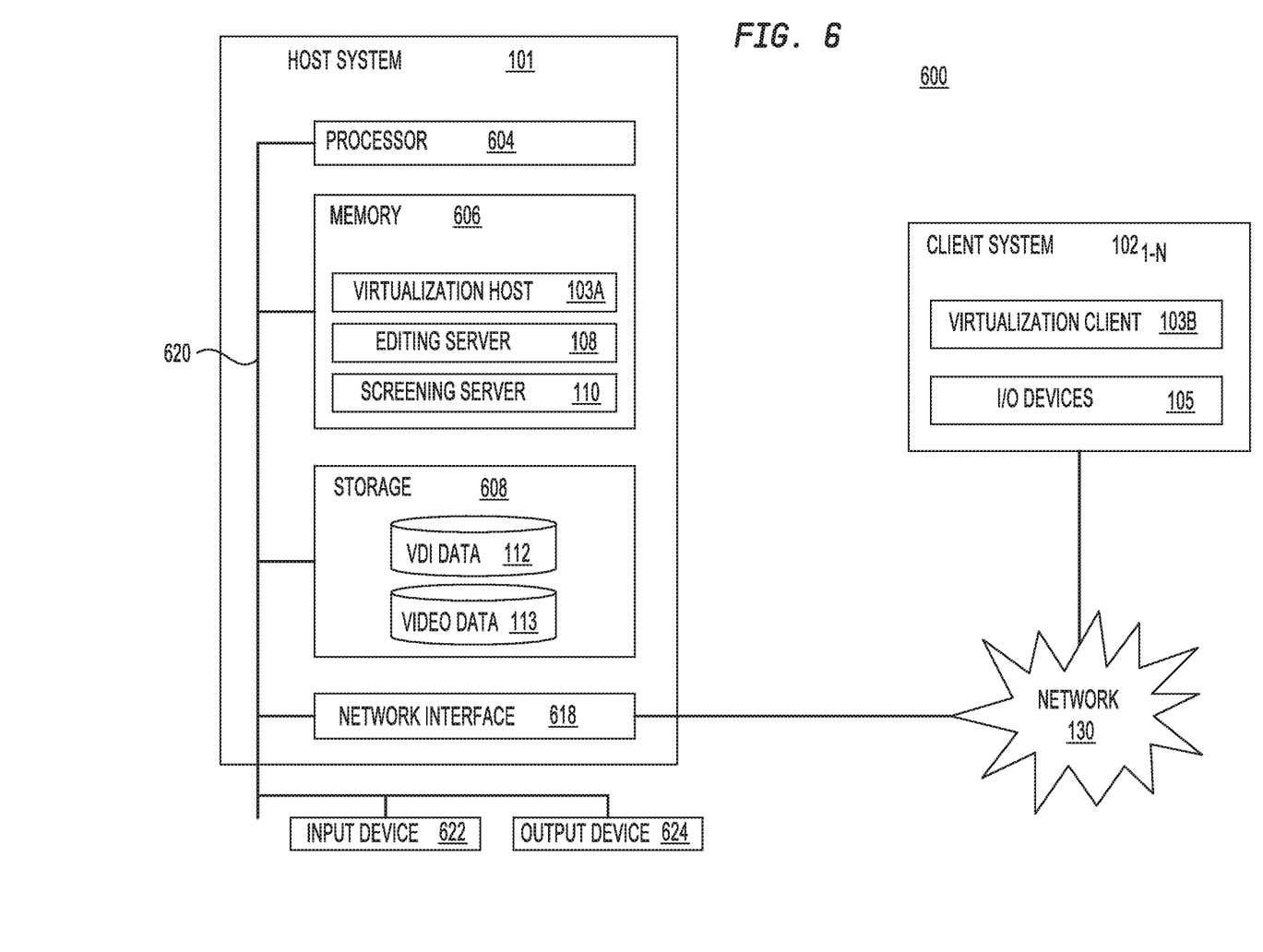
FIG. 6 illustrates a system for enhanced virtual desktop infrastructures, according to one embodiment.

FIG. 6 illustrates a system 600 for enhanced virtual desktop infrastructures, according to one embodiment. The networked system 600 includes the host system 101 of FIG. 1. The host system 101 may also be connected to other computers, e.g., the client systems $102_{1-N}$ via the network 130. In general, the network 130 may be a telecommunications network, a wide area network (WAN), or both. In a particular embodiment, the network 130 is the Internet.

The host system 101 generally includes a processor 604 which obtains instructions and data via a bus 620 from a memory 606 or a storage 608. The host system 101 may also include one or more network interface devices 618, input devices 622, and output devices 624 connected to the bus 620. The host system 101 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the host system 101 to communicate with other computers via the network 130.

The storage 608 is representative of hard-disk drives, solid state drives, flash memory devices, optical media and the like. Generally, the storage 608 stores application programs and data for use by the host system 101. In addition, the memory 606 and the storage 608 may be considered to include memory physically located elsewhere; for example, on another computer coupled to the host system 101 via the bus 620.

The input device 622 may be any device for providing input to the host system 101. For example, a keyboard or a mouse may be used. The input device 622 represents a wide variety of input devices, including keyboards, mice, controllers, and so on. Furthermore, the input device 622 may include a set of buttons, switches or other physical device mechanisms for controlling the host system 101. The output device 624 may include output devices such as monitors, touch screen displays, and so on.

As shown, the memory 606 contains the virtualization host 103A, editing server 108, and the screening server 110, each described in greater detail above. The storage 608 includes the VDI data 112 and the video data 113. The system 600 is generally configured to implement all systems, methods, and functionality described above with reference to FIGS. 1-5. As previously stated, the VDI data 112 stores recorded VDI sessions hosted by the virtualization host 103A for one or more client systems $102_{1-N}$. The client systems $102_{1-N}$ each include at least a processor 604, memory 606, network interface 618, and bus 620, each not pictured for clarity. The client systems $102_{1-N}$ may further include a storage 608. The client systems $102_{1-N}$ further include the virtualization client 103B and one more I/O devices 105 (e.g., a display, input device, and output device). Generally, a user may provide input to applications (e.g., the editing application 109, the screening application 111, etc.) executing on the host system 101 via the I/O devices 105 of the client systems $102_{1-N}$. The virtualization host 103A may then store an indication of the received input in the VDI data 112 as described above.

Advantageously, embodiments disclosed herein provide techniques to record remote application sessions (e.g., VDI sessions). Doing so exposes enhanced remote editing, screening, and other application functionality. Furthermore, by replicating any user I/O stored in the VDI data 112, forensic analysis and troubleshooting is improved during VDI sessions.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations or block diagrams of methods, apparatus (systems) and computer program products according to embodiments of the invention. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the virtualization host 103A could execute on a computing system in the cloud and host VDI sessions for one or more remote users. In such a case, the virtualization host 103A could store application desktop image data and I/O state data at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
providing, by a virtual desktop infrastructure (VDI) host and to a first client system via a network, access to an application executing on a host system;
receiving, from the first client system, at least one internet protocol (IP) packet specifying attributes of a first input to the application, wherein the first input is provided by an input/output (I/O) device of the first client system;
receiving, from a time source, a first timestamp to associate with the first input; and
storing the attributes of the first input and the first timestamp as metadata of a first image comprising a first frame of a video output of the application, wherein the first frame corresponds to the first timestamp.

2. The method of claim 1, further comprising:
compressing a second image comprising a second frame of the video output of the application;
encrypting the compressed second image and data describing an I/O state of the application;
generating, based on a modified IP protocol, one or more IP packets encapsulating the encrypted compressed second image and data describing the I/O state of the application;
transmitting the one or more IP packets to the first client system via the network; and
storing (i) a second timestamp received from the time source to associate with the second frame and (ii) the data describing the I/O state of the application as metadata of the second image.

3. The method of claim 1, wherein access to the application is provided to a plurality of client systems including the first client system, the method further comprising:
upon determining the plurality of client systems are connected to a same local area network (LAN), transmitting the one or more IP packets as a multicast stream; and
upon determining the plurality of client systems are not connected to the same LAN, transmitting, to each client system, the one or more IP packets as a respective uniform datagram protocol (UDP) unicast stream of a plurality of synchronized UDP streams.

4. The method of claim 1, wherein access to the application is provided to a plurality of client systems including the first client system, the method further comprising:
- determining, by an arbitration manager of the VDI host, that a second client system of the plurality of client systems controls inputs to the application;
- receiving, by the VDI host from the second client system, at least one IP packet encapsulating an indication of a second input provided by an I/O device of the second client system;
- extracting, by the VDI host from the at least one IP packet received from the second client system, the indication of the second input; and
- storing (i) a second timestamp received from the time source to associate with the second input and (ii) the indication of the second input.

5. The method of claim 4, wherein the VDI host receives the at least one IP packet from the second client system as a UDP unicast stream, wherein the indication of the second input is encrypted, the method further comprising decrypting the indication of the second input.

6. The method of claim 1, wherein the attributes of the first input comprise at least one of: (i) a type of the I/O device, (ii) a type of the first input, or (iii) a location on the video output of the application where the first input is received.

7. The method of claim 1, wherein the first input comprises one or more of: (i) mouse input, (ii) keystroke input, (iii) speech input, or (iv) biometric input.

8. A non-transitory computer-readable medium having computer-readable program code embodied therewith, the computer-readable program code executable by a processor to perform an operation comprising:
- providing, by a virtual desktop infrastructure (VDI) host and to a first client system via a network, access to an application executing on a host system;
- receiving, from the first client system, at least one internet protocol (IP) packet specifying attributes of a first input to the application, wherein the first input is provided by an input/output (I/O) device of the first client system;
- receiving, from a time source, a first timestamp to associate with the first input; and
- storing the attributes of the first input and the first timestamp as metadata of a first image comprising a first frame of a video output of the application, wherein the first frame corresponds to the first timestamp.

9. The non-transitory computer-readable medium of claim 8, the operation further comprising:
- compressing a second image comprising a second frame of the video output of the application;
- encrypting the compressed second image and data describing an I/O state of the application;
- generating, based on a modified IP protocol, one or more IP packets encapsulating the encrypted compressed second image and data describing the I/O state of the application;
- transmitting the one or more IP packets to the first client system via the network; and
- storing (i) a second timestamp received from the time source to associate with the second frame and (ii) the data describing the I/O state of the application as metadata of the second image.

10. The non-transitory computer-readable medium of claim 8, wherein access to the application is provided to a plurality of client systems including the first client system, the operation further comprising:
- upon determining the plurality of client systems are connected to a same local area network (LAN), transmitting the one or more IP packets as a multicast stream; and
- upon determining the plurality of client systems are not connected to the same LAN, transmitting, to each client system, the one or more IP packets as a respective uniform datagram protocol (UDP) unicast stream of a plurality of synchronized UDP streams.

11. The non-transitory computer-readable medium of claim 8, wherein access to the application is provided to a plurality of client systems including the first client system, the operation further comprising:
- determining, by an arbitration manager of the VDI host, that a second client system of the plurality of client systems controls inputs to the application;
- receiving, by the VDI host from the second client system, at least one IP packet encapsulating an indication of a second input provided by an I/O device of the second client system;
- extracting, by the VDI host from the at least one IP packet received from the second client system, the indication of the second input; and
- storing (i) a second timestamp received from the time source to associate with the second input and (ii) the indication of the second input.

12. The non-transitory computer-readable medium of claim 11, wherein the VDI host receives the at least one IP packet from the second client system as a UDP unicast stream, wherein the indication of the second input is encrypted, the operation further comprising decrypting the indication of the second input.

13. The non-transitory computer-readable storage medium of claim 8, wherein the attributes of the first input comprise at least one of: (i) a type of the I/O device, (ii) a type of the first input, or (iii) a location on the video output of the application where the first input is received.

14. The non-transitory computer-readable medium of claim 8, wherein the first input comprises one or more of: (i) mouse input, (ii) keystroke input, (iii) speech input, or (iv) biometric input.

15. A system, comprising
a computer processor; and
a memory containing a program which, when executed by the computer processor, performs an operation comprising:
- providing, by a virtual desktop infrastructure (VDI) host and to a first client system via a network, access to an application executing on a host system;
- receiving, from the first client system, at least one internet protocol (IP) packet specifying attributes of a first input to the application, wherein the first input is provided by an input/output (I/O) device of the first client system;
- receiving, from a time source, a first timestamp to associate with the first input; and
- storing the attributes of the first input and the first timestamp as metadata of a first image comprising a first frame of a video output of the application, wherein the first frame corresponds to the first timestamp.

16. The system of claim 15, the operation further comprising:
- compressing a second image comprising a second frame of the video output of the application;
- encrypting the compressed second image and data describing an I/O state of the application;

generating, based on a modified IP protocol, one or more IP packets encapsulating the encrypted compressed second image and data describing the I/O state of the application;

transmitting the one or more IP packets to the first client system via the network; and storing (i) a second timestamp received from the time source to associate with the second frame and (ii) the data describing the I/O state of the application as metadata of the second image.

17. The system of claim 15, wherein access to the application is provided to a plurality of client systems including the first client system, the operation further comprising:

upon determining the plurality of client systems are connected to a same local area network (LAN), transmitting the one or more IP packets as a multicast stream; and upon determining the plurality of client systems are not connected to the same LAN, transmitting, to each client system, the one or more IP packets as a respective uniform datagram protocol (UDP) unicast stream of a plurality of synchronized UDP streams.

18. The system of claim 15, wherein access to the application is provided to a plurality of client systems including the first client system, the operation further comprising:

determining, by an arbitration manager of the VDI host, that a second client system of the plurality of client systems controls inputs to the application;

receiving, by the VDI host from the second client system, at least one IP packet encapsulating an indication of a second input provided by an I/O device of the second client system;

extracting, by the VDI host from the at least one IP packet received from the second client system, the indication of the second input; and storing (i) a second timestamp received from the time source to associate with the second input and (ii) the indication of the second input.

19. The system of claim 18, wherein the VDI host receives the at least one IP packet from the second client system as a UDP unicast stream, wherein the indication of the second input is encrypted, the operation further comprising decrypting the indication of the second input.

20. The system of claim 15, wherein the attributes of the first input comprise at least one of: (i) a type of the I/O device, (ii) a type of the first input, or (iii) location on the video output of the application where the first input is received, wherein the first input comprises one or more of: (i) mouse input, (ii) keystroke input, (iii) speech input, or (iv) biometric input.

* * * * *

UNITED STATES PATENT AND TRADEMARK OFFICE
CERTIFICATE OF CORRECTION

PATENT NO. : 10,678,569 B2  
APPLICATION NO. : 15/911387  
DATED : June 9, 2020  
INVENTOR(S) : Rabindra Mukraj et al.

Page 1 of 1

It is certified that error appears in the above-identified patent and that said Letters Patent is hereby corrected as shown below:

In the Specification

In Column 4, Line 57, delete "1036." and insert -- 103B. --, therefor.

In the Claims

In Column 14, Line 33, in Claim 13, after "computer-readable" delete "storage".

Signed and Sealed this  
Third Day of November, 2020

Andrei Iancu  
*Director of the United States Patent and Trademark Office*